United States Patent
Olszewski et al.

(10) Patent No.: US 8,473,684 B2
(45) Date of Patent: Jun. 25, 2013

(54) DELAYED REPLACEMENT OF CACHE ENTRIES

(75) Inventors: Bret R. Olszewski, Austin, TX (US); Basu Vaidyanathan, Austin, TX (US); Steven W. White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/644,678

(22) Filed: Dec. 22, 2009

(65) Prior Publication Data

US 2011/0153949 A1 Jun. 23, 2011

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl.
USPC ........... 711/133; 711/134; 711/202; 711/205; 711/206

(58) Field of Classification Search
USPC ........... 711/133, 134, 202, 205, 206, E12.059
See application file for complete search history.

(56) References Cited

U.S. PATENT DOCUMENTS

| | | |
|---|---|---|
| 5,282,274 A | 1/1994 | Liu |
| 5,526,504 A | 6/1996 | Hsu et al. |
| 5,802,594 A | 9/1998 | Wong et al. |
| 5,875,464 A | 2/1999 | Kirk |
| 6,047,362 A | 4/2000 | Zucker |
| 6,393,544 B1 | 5/2002 | Bryg et al. |
| 6,393,545 B1 | 5/2002 | Long et al. |
| 6,732,238 B1 * | 5/2004 | Konas et al. ............... 711/128 |
| 7,484,074 B2 * | 1/2009 | Hepkin et al. ............. 711/208 |
| 7,487,329 B2 * | 2/2009 | Hepkin et al. ............. 711/203 |
| 2006/0277389 A1 * | 12/2006 | Hepkin et al. ............. 711/203 |
| 2007/0067604 A1 | 3/2007 | Elnozahy et al. |
| 2007/0180215 A1 | 8/2007 | Cascaval et al. |
| 2008/0183986 A1 | 7/2008 | Yehia et al. |
| 2009/0113135 A1 | 4/2009 | Cain et al. |

OTHER PUBLICATIONS

"Concurrent Support of Multiple Page Sizes on a Skewed Associative TLB", Adnre Seznec, IEEE Transactions on Computers, Oct. 9, 2003.*

(Continued)

*Primary Examiner* — Michael Alsip
(74) *Attorney, Agent, or Firm* — DeLizio Gilliam, PLLC

(57) ABSTRACT

A cache entry replacement unit can delay replacement of more valuable entries by replacing less valuable entries. When a miss occurs, the cache entry replacement unit can determine a cache entry for replacement ("a replacement entry") based on a generic replacement technique. If the replacement entry is an entry that should be protected from replacement (e.g., a large page entry), the cache entry replacement unit can determine a second replacement entry. The cache entry replacement unit can "skip" the first replacement entry by replacing the second replacement entry with a new entry, if the second replacement entry is an entry that should not be protected (e.g., a small page entry). The first replacement entry can be skipped a predefined number of times before the first replacement entry is replaced with a new entry.

18 Claims, 6 Drawing Sheets

OTHER PUBLICATIONS

"Virtual Memory Support for Multiple Page Sizes", Yousef A. Khalid, Madhusudhan Talluri, Michael N. Nelson, Dock Williams; Sun Microsystems Inc., Workstation Operating Systems, Oct. 14-15, 1993.*

"General Purpose Operating System Support for Multiple Page Sizes", Narayanan Ganapathy and Curt Schimmel; Silicon Graphics Computer Systems, Inc.; Proceedings of the USENIX Annual Technical Conference (NO 98) New Orleans, Louisiana, Jun. 1998.*

"Tradeoffs in Supporting Two Page Sizes", Madhusudhan Talluri, Shing Kong, Mark D. Hill, David A. Patterson; Nineteenth International Symposium on Computer Architecture, Jun. 1992.*

Lee, Jung-Noon et al., "A dynamic TLB management structure to support different page sizes", Conf. Ttl.: Proceedings of Second IEEE Asia Pacific Conference on ASICs AP-ASIC; Database: INSPEC; Publisher: IEEE, Piscataway, NJ; Country of Publication: USA Aug. 2000 , pp. 299-302 (inclusive).

* cited by examiner though examples refer to translation lookaside buffers, embodiments can be utilized in other types of cache structures (Domain Name Service (DNS) caches, central processing unit (CPU) caches, effective to real address translation (ERAT) caches, segment lookaside buffers (SLB), etc.). In other instances, well-known instruction instances, protocols, structures and techniques have not been shown in detail in order not to obfuscate the description.

US 8,473,684 B2

DELAYED REPLACEMENT OF CACHE ENTRIES

BACKGROUND

Embodiments of the inventive subject matter generally relate to the field of memory caching, and, more particularly, to delayed replacement of cache entries.

Processor architectures can support multiple virtual memory page sizes. For example, the IBM® POWERS+™ processor supports 4 KB, 64 KB, 16 MB, and 16 GB virtual memory pages. Some processor architectures utilize a single translation lookaside buffer (TLB) to store address translations (i.e., mapping between virtual and physical addresses) for all the supported page sizes. TLB entries corresponding to larger pages are often more valuable than TLB entries for smaller pages because the larger pages provide more coverage of address space in a page table.

SUMMARY

Embodiments include a method directed to identifying, in response to a cache miss, a first replacement entry from a plurality of entries in a cache. If the first replacement entry should be protected from replacement, a second replacement entry can be determined from the plurality of entries in the cache. If the second replacement entry in the cache should not be protected from replacement, the second replacement entry can be replaced with a new entry.

Embodiments include a computer program product for delayed replacement of cache entries. In some embodiments, the computer program product comprises a computer readable storage medium having computer readable program code. The computer readable program code can be configured to identify, in response to a cache miss, a first replacement entry from a plurality of entries in a cache. If the first replacement entry should be protected from replacement, a second replacement entry can be determined from the plurality of entries in the cache. If the second replacement entry in the cache should not be protected from replacement, the second replacement entry can be replaced with a new entry.

Embodiments include a computer program product for delayed replacement of translation lookaside buffer entries corresponding to large page sizes. In some embodiments, the computer program product comprises a computer readable storage medium having computer readable program code. The computer readable program code can be configured to identify, in response to a translation lookaside buffer miss, a first replacement entry from a plurality of entries in a translation lookaside buffer. If the first replacement entry should not be replaced because the first replacement entry corresponds to a large page size, a second replacement entry can be determined from the plurality of entries in the cache. If the second replacement entry corresponds to a small page size, the second replacement entry can be replaced with a new entry.

Embodiments include an apparatus that comprises a processing unit, a network interface, and a cache entry replacement unit. In some embodiments, the cache entry replacement unit is operable to identifying, in response to a cache miss, a first replacement entry from a plurality of entries in a cache. If the first replacement entry should be protected from replacement, a second replacement entry can be determined from the plurality of entries in the cache. If the second replacement entry in the cache should not be protected from replacement, the second replacement entry can be replaced with a new entry.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to translation lookaside buffers, embodiments can be utilized in other types of cache structures (Domain Name Service (DNS) caches, central processing unit (CPU) caches, effective to real address translation (ERAT) caches, segment lookaside buffers (SLB), etc.). In other instances, well-known instruction instances, protocols, structures and techniques have not been shown in detail in order not to obfuscate the description.

When a requested address is not found in a TLB (i.e., a TLB miss occurs), an entry corresponding to a large page ("large page entry") has the same likelihood of being replaced as an entry corresponding to a small page ("small page entry") because generic replacement techniques (least recently used, most recently used, etc.) usually treat all of the TLB entries equally. Replacing the large page entries with small page entries, can lead to higher miss rates because the large page entries are more valuable than small page entries because the large pages provide more coverage of address space in a page table than the small pages. A cache entry replacement unit can delay replacement of more valuable entries by replacing less valuable entries. When a miss occurs, the cache entry replacement unit can determine a cache entry for replacement ("a replacement entry") based on a generic replacement technique. For example, the replacement entry may represent the least recently used entry. If the replacement entry is an entry that should be protected from replacement (e.g., a large page entry), the cache entry replacement unit can determine a second replacement entry. For example, the second replacement entry can represent a second least recently used entry. The cache entry replacement unit can "skip" the first replacement entry by replacing the second replacement entry with a new entry, if the second replacement entry is an entry that should not be protected (e.g., a small page entry). The first replacement entry can be skipped a predefined number of times before the first replacement entry is replaced with a new entry.

Figure 1:
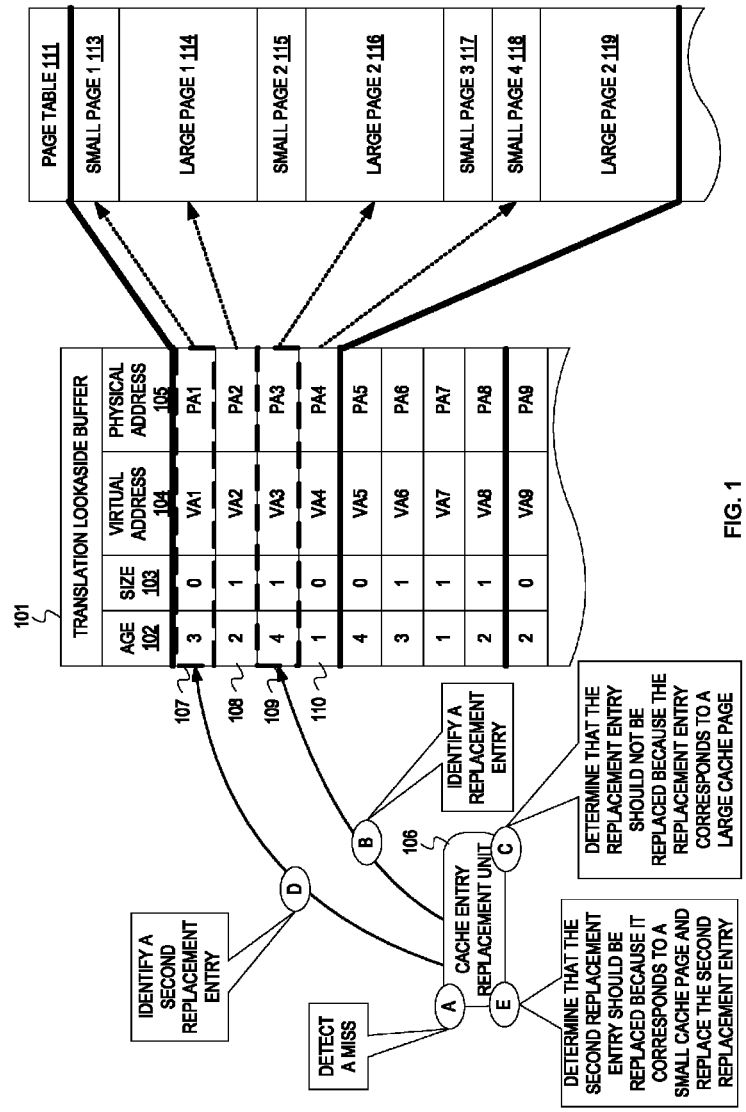
FIG. 1 is an example conceptual diagram of delaying replacement of an entry corresponding to a large page in a TLB.

FIG. 1 is an example conceptual diagram of delaying replacement of an entry corresponding to a large page in a TLB. A TLB 101 comprises a plurality of translation entries that map virtual addresses to physical addresses. In the example shown in FIG. 1, each of the plurality of entries comprises an age indication 102, a size indication 103, a virtual address 104, and a physical address 105. The virtual address 104 and physical address 105 can be represented as portions of the virtual and physical addresses that do not change. For example, the upper bits of a virtual/physical address correspond to a page table entry while the lower bits correspond to a word within the page table entry. So, the entry in the TLB may comprise the upper bits of the virtual/physical address.

In the example shown in FIG. 1, the TLB 101 is configured as a 4-way set associative cache such that any translation entry corresponding to an entry of a page table 111 can only be stored in one of four lines in the TLB 101. Entries 113, 114, 115, 116, 117, 118, and 119 of the page table 111 are associated with a first associative set that comprises the first four lines 107, 108, 109, and 110 of the TLB 101. The page table entries 113, 115, 117, and 118 are small pages (e.g., 4 KB pages). The page table entries 114, 116, and 119 are large pages (e.g., 64 KB pages, 16 MB pages, and/or 16 GB pages). Although the page table entries are depicted as contiguous blocks of memory in the page table 111, the page table entries may not be contiguous. As shown in FIG. 1, the TLB 101 may have various associative sets that can be associated with groups of entries in the page table 111. When a translation entry should be stored in the TLB 101, the translation entry can be stored in any of the lines in the associative set that is associated with a page table entry that corresponds to the translation entry. The translation entry cannot be stored in any other associative set.

The age indications 102 indicate the ages of the plurality of entries in the TLB 101. In this example, the ages rank entries within each four line associative set from most recently used (i.e., 1) to least recently used (i.e., 4). The size indications 103 indicate the sizes of the page table entries that correspond to the plurality of entries in the TLB 101. In this example, a "0" represents a small page and a "1" represents a large page. The age indication 102 and the size indication 103 can comprise one or more bits that are stored in the TLB 101 as part of a translation entry along with the virtual address 104 and the physical address 105.

At stage A, a cache entry replacement unit 106 detects a cache miss. For example, the cache entry replacement unit 106 determines that a requested virtual address cannot be located in the TLB 101 (i.e., a TLB miss).

At stage B, the cache entry replacement unit 106 identifies a replacement entry from a plurality of entries in the TLB 101. Identifying the replacement entry can comprise determining an associative set that is associated with a new entry to be placed into the TLB 101. Once the associative set has been determined, the cache entry replacement unit 106 identifies the replacement entry from the lines 107, 108, 109, and 110 belonging to the associative set based on a replacement technique. Examples of replacement techniques include least recently used (LRU), most recently used (MRU), random selection, etc. In this example, the cache entry replacement unit 106 identifies the replacement entry 109 based on a LRU replacement technique. The age 102 of the replacement entry 109 is "4," so the replacement entry 109 is the least recently used entry in the associative set.

At stage C, the cache entry replacement unit 106 determines that the replacement entry 109 should not be replaced (i.e., should be protected from replacement) because the replacement entry 109 corresponds to a large page. In this example, the replacement entry 109 corresponds to the "large page 2" 116. The cache entry replacement unit 106 can determine that the replacement entry 109 corresponds to a large page based on the size indication 103 in the replacement entry 109.

At stage D, the cache entry replacement unit 106 identifies a second replacement entry from the plurality of entries in the TLB 101. In the example shown in FIG. 1, the cache entry replacement unit 106 determines that the second replacement entry is the entry associated with line 107. In this example, the cache entry replacement unit 106 identifies the second replacement entry 107 based on a LRU replacement technique. The second replacement entry 107 represents a second least recently used entry in the associative set because its age indication 102 is "3."

At stage E, the cache entry replacement unit 106 determines that the second replacement entry 107 should be replaced because the second replacement entry 107 corresponds to a small page. In this example, the second replacement entry 107 corresponds to the "small page 1" 113. The cache entry replacement unit 106 replaces the second replacement entry 107 with the new entry. Replacing the second replacement entry 107 can comprise overwriting the second replacement entry 107 with the new entry. If the second replacement entry corresponded to another large page, the cache entry replacement unit 106 may determine an additional replacement entry. In some examples, a threshold can be defined for a number of additional replacement entries that may be determined. It is noted, however, that the number of additional replacement entries may be determined based on other factors, e.g., the number of available entries, the structure of the cache, etc., as will be further described below. If none of the replacement entries correspond to a small page, the cache entry replacement unit 106 can replace the first replacement entry 109.

In addition, the cache entry replacement unit 106 can replace the first replacement entry 109 if a threshold is met for a number of times that the replacement entry 109 was protected from replacement. In other words, the replacement entry 109 can be protected from replacement a certain number of times indicated by the threshold before the replacement entry 109 is replaced. In some embodiments, the cache entry replacement unit 106 can maintain an individual count representing a number of times that an each of the entries in the TLB 101 was protected. It is noted that in some examples the individual counts can be stored as a part of each of the entries in the TLB 101. In other embodiments, a count for a number of times that any entry within an associative set has been protected can be maintained for each associative set in the TLB 101. For example, in a 4-way set associative cache, a single count can be maintained (e.g., by the cache entry replacement unit 106) for each group of four entries that represent each associative set.

In the example given in FIG. 1, large pages where defined as 64 KB, 16 MB, and/or 16 GB pages and a single threshold was defined for protecting entries associated with the large pages. However, more than one threshold can be defined for the different sizes of large pages. For example, entries corresponding to 16 GB pages may be protected from replacement more times than entries corresponding to the 64 KB and 16 MB pages. In some embodiments, the first replacement entry corresponding to one of the large page sizes can be replaced if other replacement entries also correspond to large page sizes. For example, there are two replacement entries. The first replacement entry corresponds to a 16 MB page size and the second entry corresponds to a 64 KB page size. The cache entry replacement unit 106 can replace the first page size because both page sizes should be protected. In other embodiments, when a 16 GB page is protected from replacement and a second replacement entry is selected, the second replacement entry can be 4 KB, 64 KB, or 16 MB page. When a 16 MB page is protected, the second replacement entry can be a 4 KB or 64 KB page. Priority can be given to the page sizes so that the cache entry replacement unit 106 can select the second replacement entry from smallest to largest page size. The cache entry replacement unit 106 can compare the sizes of the replacement entries to determine which of the replacement entries should be replaced based on the smallest size. In one example, there may be three replacement entries. The size of a first replacement entry is 16 MB, the size of a second replacement entry is 64 KB, and the size of a third replacement entry is 4 KB. The cache entry replacement unit 106 can replace the third replacement entry because the third replacement entry is the smallest. In another example, there may be two replacement entries. The first replacement entry is 64 KB and the second replacement entry is 16 MB. The cache entry replacement unit 106 can replace the first replacement entry because the first replacement entry is the smallest.

The cache entry replacement unit 106 can also replace the first replacement entry 109 if a number of entries that should be protected exceeds a maximum. The maximum can apply to the entire TLB 101 or the maximum can apply to each associative set in the TLB 101.

Although FIG. 1 depicts the TLB 101 as a 4-way set associative cache, embodiments are not so limited. The TLB 101 can be configured an N-way set associative cache, where N is greater than 1. The TLB 101 can also be configured as a fully associative cache. It is further noted that embodiments are also not limited to TLBs; in some embodiments, the cache can be other types of translation caches, such as ERAT caches, SLBs, etc., and may be also be instruction or data caches. FIGS. 2-5 are flowcharts depicting example operations for delaying replacement of protected entries in a cache. Flow begins at block 201, where a cache miss is detected. For example, a cache entry replacement unit determines that requested data cannot be found in a cache.

At block 202, a first replacement entry is identified from entries in a cache in accordance with a replacement technique. For example, the replacement entry can be identified based on a most recently used replacement technique. It is noted, however, that in other examples the replacement entry can be selected by other replacement techniques; e.g, the replacement entry can be selected randomly.

At block 203, it is determined if the first replacement entry is an entry that should be protected from replacement. Determining if the first replacement entry should be protected from replacement can comprise examining contents of the first replacement entry. For example, the contents of the first replacement entry may indicate that the first replacement entry corresponds to a large page size, so the first replacement entry should be protected from replacement. More than one type of entry can be protected for replacement. For example, there may be a plurality of predefined large page sizes (e.g., 64 KB, 16 MB and/or 16 GB) and a predefined small page size (e.g., 4 KB). A cache entry replacement unit can determine if content of the first replacement entry indicates any of the plurality of predefined the large page sizes (e.g., 64 KB, 16 MB and/or 16 GB). If the content indicates any of the large page sizes, the cache entry replacement unit can determine that the first protected entry should be protected from replacement. As another example, there may be a plurality of predefined large page sizes (e.g., 16 MB and 16 GB) and a plurality of predefined small page sizes (e.g., 64 KB and 4 KB). The cache entry replacement unit determines that the entries with content indicating the 16 MB size or the 16 GB size should be protected while the entries with content indicating the 64 KB size or the 4 KB should not be protected. In some embodiments, entries corresponding to page sizes that are greater a predefined page size threshold can be protected. For example, the predefined page size threshold can be 4 KB. The cache entry replacement unit can determine that the first replacement entry should be protected if the content indicates a page size larger than 4 KB (e.g., 64 KB, 16 MB and/or 16 GB). As another example, the predefined page size threshold can be 64 KB. The cache entry replacement unit can determine that first replacement entry should be protected if the content indicates a page size larger than 64 KB (e.g., 16 MB and/or 16 GB). The cache entry replacement unit can determine that first replacement entry should not be protected if the content indicates a page size smaller than or equal to 64 KB (e.g., 64 KB and/or 4 KB). If the first replacement entry should be protected from replacement, flow continues at block 204. If the first replacement entry should not be protected from replacement, flow continues at block 207.

At block 204, it is determined if a threshold has been met for a number of times the first replacement entry has been protected. The threshold indicates the number of times the replacement entry can be protected before the replacement entry should be replaced. Determining if the threshold has been met can comprise the cache entry replacement unit determining if a counter representing the number of times the replacement entry has been protected is equal to the threshold. In some embodiments, each entry of the cache that should be protected is associated with an individual counter. In other embodiments, the entries in the cache can be grouped and one counter can be associated with each group. For example, the entries can be grouped based on associative sets. If there is more than one type of protected entry, a different threshold can be defined for each different type of protected entry depending on the likelihood of repeated access of each type of entry. For example, three different large page sizes, 64 KB, 16 MB, and 16 GB, may be supported in a particular architecture. Three thresholds can be defined so that the entries corresponding to the 16 GB page size can be protected twice as many times as entries corresponding to the 16 MB page size and entries corresponding to the 16 MB page can be protected twice as many times as entries corresponding to the 64 KB page size. If the threshold has not been met, flow continues at block 205. If the threshold has been met, flow continues at block 501 of FIG. 5.

At block 205, it is determined if a number of protected entries in the cache exceeds a maximum. A maximum number of entries can be protected so that the cache does not become dominated by protected entries (e.g., large page entries) while allowing unprotected entries to have a chance to be represented in the cache. The number of protected entries can be represented by a count. The count can indicate a total number of protected entries in the entire cache or a number of protected entries in groups (e.g., associative sets) of cache entries. In addition, more than one count can be maintained if there is more than one type of protected entry. For example, a first count can be maintained for a 16 GB page size, a second count for a 16 MB page size, and a third count for a 64 KB page size. If the number of protected entries is below the maximum, flow continues at block 206. If the number of protected entries exceeds the maximum, flow continues at block 501 of FIG. 5.

At block 206, a second replacement entry is identified in accordance with the replacement technique. In the example described above, since the first replacement entry was identified based on an LRU replacement technique, the second replacement entry is identified based on the LRU replacement technique. In this example, the first replacement entry represents the least recently used entry and the second replacement entry represents the second least recently used entry. As described above, it is noted, however, that other replacement techniques (e.g., random selection, most recently used, etc.) can be utilized to identify the first and second replacement candidates. Flow continues at block 301 of FIG. 1

At block 207, the first replacement entry is replaced with a new entry. In this case, the first replacement entry is an unprotected entry. For example, the first replacement entry represents a TLB entry that is associated with a small page. The cache entry replacement unit can overwrite a line containing the first replacement entry with the new entry. Flow continues at block 304 of FIG. 3.

Figure 2:
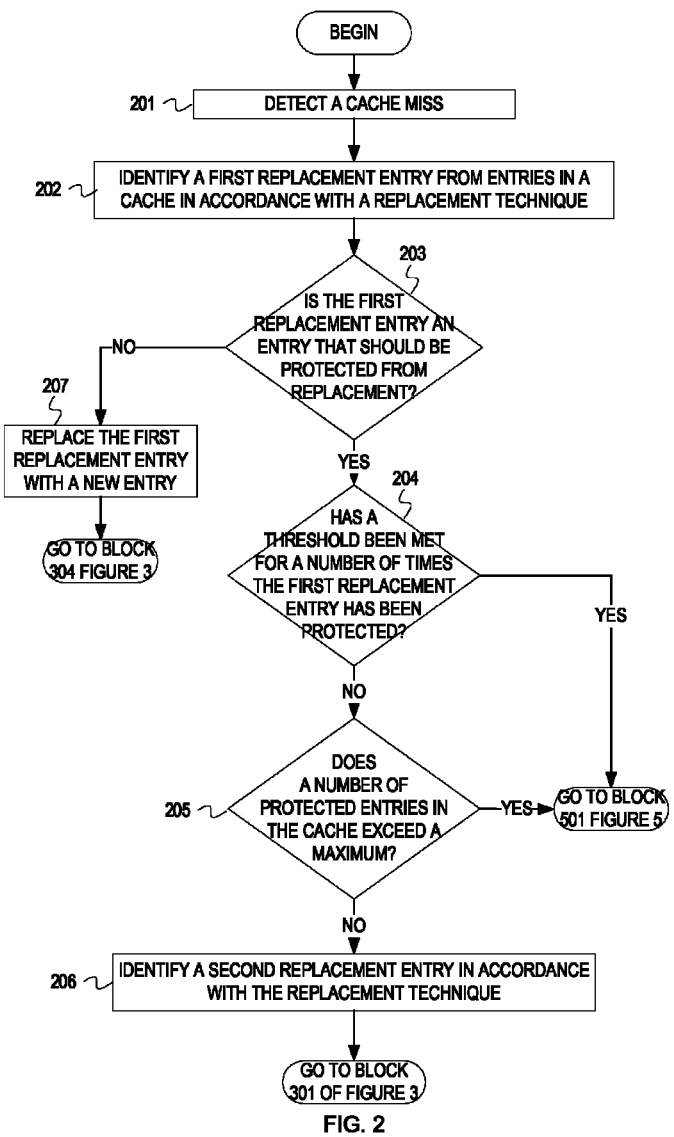
FIG. 2 is a flowchart depicting example operations for delaying replacement of protected entries in a cache.
Figure 3:
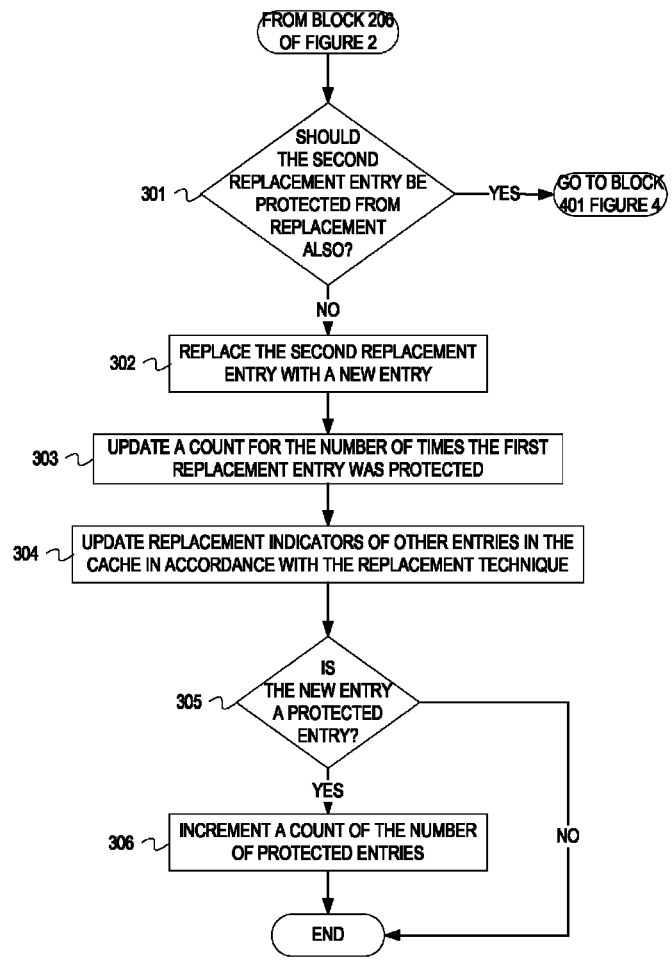
FIG. 3 is a flowchart depicting example operations for delaying replacement of protected entries in a cache that continue from FIG. 2.

FIG. 3 is a flowchart depicting example operations for delaying replacement of protected entries in a cache that continue from FIG. 2. The flow continues from block 206 of FIG. 2 at block 301, where it is determined if the second replacement entry should be protected from replacement also. For example, the first replacement entry and the second replacement entry are entries in a TLB that correspond to large pages. Because the second replacement entry corresponds to a large page, the second replacement entry should also be protected. As another example, the first replacement entry corresponds to a large page size and the second replacement entry corresponds to a small page size, so the cache entry replacement unit determines that the second replacement candidate should not be protected. If there is more than one type of protected entry, different thresholds can be defined for the different types of protected entries. The thresholds can indicate a hierarchy of the types of protected cache entries. If content of the second replacement entry indicates that the second replacement entry should be protected, the cache entry replacement unit may determine that the second replacement entry should not be protected if a type of the second replacement entry falls below a type of the first replacement entry in the hierarchy. For example, the cache entry replacement unit determines that the first replacement entry corresponds to a 16 MB page size and the second replacement entry corresponds to a 64 KB page size. Even though 64 KB may be defined as a large page size, the cache entry replacement unit may determine that the second replacement entry should not be protected because the first replacement entry corresponded to a larger page size. If the second replacement entry should not be protected, flow continues at block 302. If the second replacement entry should be protected, flow continues at block 401 of FIG. 4.

At block 302, the second replacement entry is replaced with a new entry. For example, the first replacement entry corresponds to a large page and the second replacement entry corresponds to a small page, so the second replacement entry should be replaced instead of the first replacement entry. As another example, there may be more than one predefined large page size (e.g., 16 GB, 16 MB, and 64 KB) that should be protected. The first replacement entry corresponds to a 16 MB size and the second replacement entry corresponds to the 64 KB size. The cache entry replacement unit can replace the second replacement entry because the second replacement entry's corresponding page size is smaller than the first replacement entry's corresponding page size.

At block 303, a count for the number of times the first replacement entry was protected is updated. For example, the count associated with the cache entry represented by the first replacement entry is updated. As another example, the count associated with a group of cache entries in which the first replacement entry belongs is updated.

At block 304, replacement indicators of other entries in the cache are updated in accordance with the replacement technique. For example, the replacement indicators are updated in accordance with a LRU replacement technique. The new entry's replacement indicator indicates that the new entry is the most recently used. The cache entry replacement unit can increment the replacement indicators of the other entries based on the LRU replacement technique to indicate that the other entries are older.

At block 305, it is determined if the new entry is a protected entry. In this case, an unprotected entry can be replaced with a protected entry. For example, an entry corresponding to a small page is replaced with an entry corresponding to a large page. If the new entry is a protected entry (e.g., a large page entry), flow continues at block 306. If the new entry is not a protected entry, flow ends.

At block 306, a count of the number of protected entries is incremented. For example, the number of protected entries in the cache increased because an unprotected entry was replaced with a protected entry.

Figure 4:
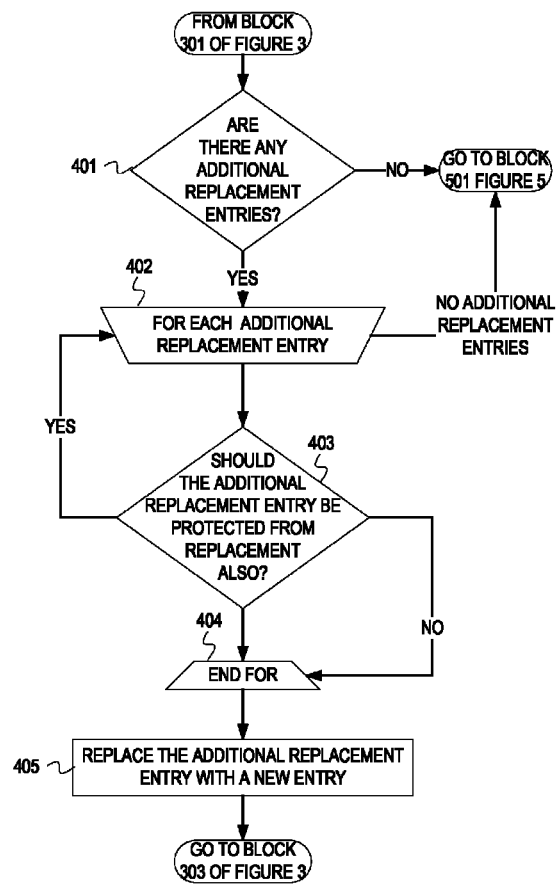
FIG. 4 is a flowchart depicting example operations for delaying replacement of protected entries in a cache that continue from FIG. 3.

FIG. 4 is a flowchart depicting example operations for delaying replacement of protected entries in a cache that continue from FIG. 3. The flow continues from block 301 of FIG. 3 at block 401 of FIG. 4, where it is determined if there are any additional replacement entries available. A number of replacement entries can be identified based on a threshold. For example, a threshold indicates that up to three replacement entries can be identified. When an LRU replacement technique is used, the three replacement entries represent the least recently used, the second least recently used, and the third least recently used, respectively. The threshold can be determined based on the number of entries that are available for replacement in the cache and/or the cache structure. For example, in a 4-way set associative cache, there are only four available entries for placing any new entry. So, two replacement entries (e.g., a least recently used entry and a second least recently used entry) may be considered for replacement because it may not be desirable to replace the other two entries in an associative set (e.g., a most recently used entry and a second most recently used entry). As another example, in a fully associative cache, a new entry can be placed in any entry of the cache. If there are N entries in the cache, there are N entries available for replacement. The threshold can be set between 2 and N depending on cost (e.g., computation time, circuit area, etc) to consider each of the replacement candidates. The additional replacement entries can also be identified based on a hierarchy of types of protected entries. For example, the cache entry replacement unit selects additional replacement entries from smallest to largest page size in the hierarchy. If there are additional replacement entries, flow continues at block 402. If there are no additional replacement entries, flow continues at block 501 of FIG. 5.

At block 402, a loop begins for each additional replacement entry. When there are additional replacement entries, flow continues at block 403. After the loop reaches the last additional replacement entry without finding an unprotected replacement entry, flow continues at block 501 FIG. 5.

At block 403, it is determined if the additional replacement entry should be protected from replacement also. If the additional replacement entry should not be protected, flow continues at block 404. If the additional replacement entry should be protected, flow returns to block 402 for the next additional replacement entry.

At block 404, the loop is exited because the additional replacement entry should not be protected. Flow continues at block 405.

At block 405, the additional replacement entry is replaced with the new entry. Flow continues at block 303 of FIG. 3.

Figure 5:
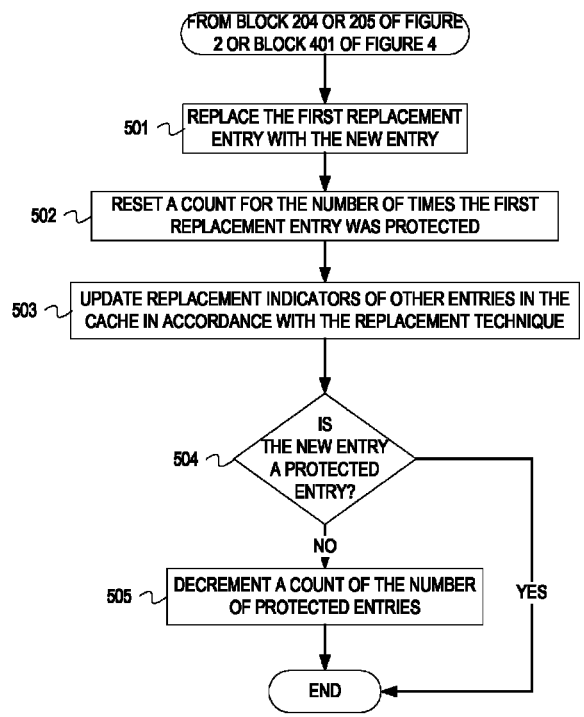
FIG. 5 is a flowchart depicting example operations for delaying replacement of protected entries in a cache that continue from FIGS. 2 and 4.

FIG. 5 is a flowchart depicting example operations for delaying replacement of protected entries in a cache that continue from FIGS. 2 and 4. Flow continues from block 204 or 205 of FIG. 2 or block 401 of FIG. 4 at block 501. When the threshold is met for a number of times the first replacement entry has been protected, the maximum number of protected entries is exceeded, or none of the additional entries are unprotected, the first replacement entry is replaced with the new entry. For example, there are two replacement entries and both the first and second replacement entry correspond to a large page size, so the cache entry replacement unit can replace the first replacement entry. If the first and second replacement entries correspond to different large page sizes, the cache entry replacement unit can replace the first replacement entry if the page size indication of first replacement entry is smaller than the page size indication of the second replacement entry. As another example, there are three replacement entries. All of the replacement candidates correspond to page sizes that should be protected. The first replacement candidate corresponds to a 64 KB page, the second replacement candidate corresponds to a 16 GB page, and the third replacement candidate corresponds to a 16 MB page. The cache entry replacement unit can replace the first replacement candidate because the first replacement candidate corresponds to the smallest page size. As another example, all of the replacement candidates correspond to the same size page, so the cache entry replacement unit can replace the first replacement candidate. As another example, the cache entry replacement unit determines that the number of times that the first replacement candidate has been protected meets a threshold, so the cache entry replacement unit can replace the first replacement candidate. As another example, the cache entry replacement unit determines that the number of protected entries in the cache exceeds a maximum, so the cache entry replacement unit can replace the first replacement candidate.

At block 502, the count for the number of times the first replacement entry was protected is reset. For example, the when the cache replacement entry overwrites the first replacement entry with the new entry, the count associated with the new entry is set to zero. As another example, the count for a group of entries in the cache is reset to zero when the first replacement entry is replaced with the new entry.

At block 503, replacement indicators of other entries in the cache are updated in accordance with the replacement technique. For example, the cache entry replacement unit updates the replacement indicators based on a most recently used replacement technique. The new entry's replacement indicator indicates that the new entry is the most recently used. The cache entry replacement unit can increment the replacement indicators of the other entries to indicate that the other entries are older.

At block 504, it is determined if the new entry is protected. If the first replacement entry is replaced with an unprotected new entry, the number of protected entries in the cache decreases. If the new entry is not protected, flow continues at block 504. If the entry is protected, flow ends.

At block 505, a count of the number of protected entries is decremented. For example, the number of protected entries in the cache decreased because a protected entry was replaced with an unprotected entry. If the number of protected entries equals zero, the count for the number of times any entry in a group was protected can be set to zero.

Although examples refer to protecting cache entries associated with large page sizes, embodiments are not so limited. In other embodiments, entries may be protected from replacement if content of the entries indicate that the entries are associated with a particular processor. As another example, entries may be protected from replacement if the content of the entries indicate that the entries are associated with a particular process.

Embodiments are not limited to the example flowcharts depicted in the above figures. Embodiments can perform additional operations, fewer operations, operations in parallel, etc. For instance, referring to FIG. 2, the operation for determining that the threshold has been met can be interchanged with the operation for determining that a maximum has been exceeded. Referring to FIG. 3, the operations for updating a count for the number of times the first replacement entry was protected and updating replacement indicators can be performed in parallel.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
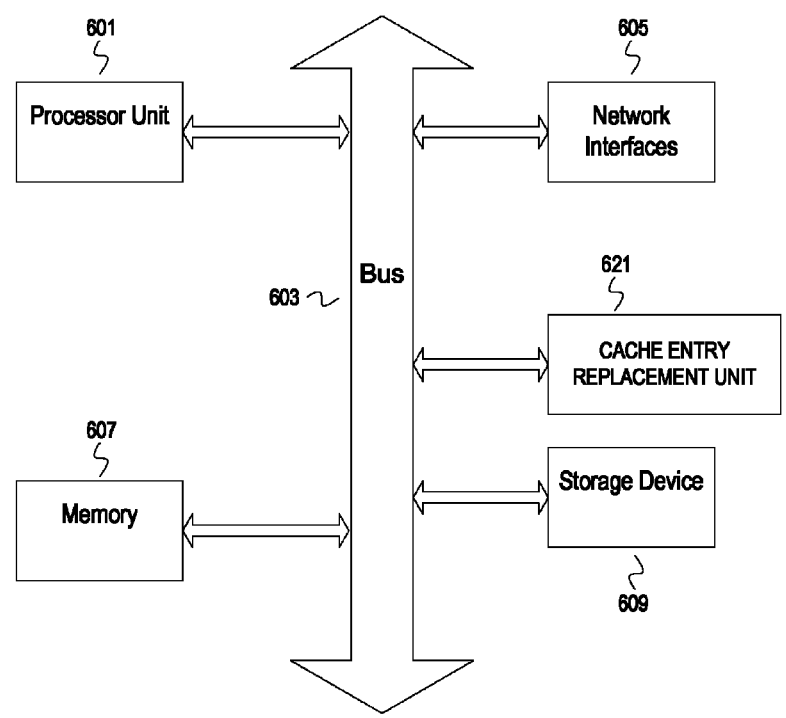
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a cache entry replacement unit 621. The cache entry replacement unit 621 can determine that a replacement entry selected to be replaced by a new entry should be protected from replacement. The cache entry replacement unit 621 can also determine a second replacement entry that should not be protected from replacement and replace the second replacement entry with the new entry. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for delayed replacement of important cache entries as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   identifying, in response to a cache miss, a first replacement entry from a plurality of entries in a cache;
   determining that the first replacement entry in the cache should be protected from replacement;
   identifying a second replacement entry from the plurality of entries in the cache;
   determining whether the second replacement entry in the cache should be protected from replacement; and
   replacing the second replacement entry in the cache with a new entry in response to determining that the second replacement entry should not be protected from replacement.

2. The method of claim 1, wherein said determining that the first replacement entry in the cache should be protected from replacement comprises:
   determining that contents of the first replacement entry indicate that the first replacement entry should be protected from replacement; and
   determining that a threshold for a number of times the first replacement entry has been protected from replacement has not been met.

3. The method of claim 2, wherein said determining that the first replacement entry in the cache should be protected from replacement further comprises determining that a maximum number of protected entries in the cache has not been met.

4. The method of claim 2, wherein said determining that the contents of the first replacement entry indicates that the first replacement entry should be protected from replacement comprises determining that the contents of the first replacement entry indicate that the first replacement entry corresponds to a page size that is greater than a predefined page size threshold.

5. The method of claim 2, wherein said determining that the contents of the first replacement entry indicates that the first replacement entry should be protected from replacement comprises determining that the contents of the first replacement entry indicate that the first replacement entry corresponds to a page size of a predefined large page size.

6. The method of claim 1, wherein said determining whether the second replacement entry in the cache should be protected from replacement comprises determining whether contents of the second replacement entry in the cache indicate that the second replacement entry in the cache corresponds to a page size that is less than a predefined page size threshold, and replacing the second replacement entry with a new entry in response to determining that the contents of the second replacement entry indicate that the second replacement entry corresponds to a page size that is less than a predefined page size threshold.

7. The method of claim 1, wherein said determining whether the second replacement entry in the cache should be protected from replacement comprises determining whether contents of the second replacement entry in the cache indicate that the second replacement entry in the cache corresponds to a page size of a predefined small page size.

8. The method of claim 7, wherein said determining whether the second replacement entry in the cache should be protected from replacement further comprises:
   replacing the second replacement entry in the cache with the new entry if the contents indicate that the second replacement entry in the cache corresponds to a small page size; and
   determining whether a third replacement entry is available in the cache for replacement if the second replacement entry in the cache does not correspond to a small page size.

9. The method of claim 8, wherein said determining whether a third replacement entry is available in the cache for replacement comprises:
   replacing the first replacement entry in the cache with the new entry if the third replacement entry is not available for replacement; and
   replacing the third replacement entry in the cache with the new entry if the third replacement entry is available for replacement and if the third replacement entry should not be protected from replacement.

10. A computer program product for delayed replacement of cache entries, the computer program product comprising:
   a computer readable storage medium having computer readable program code embodied therewith, the computer readable program code comprising:
   computer readable program code configured to,
      identify, in response to a cache miss, a first replacement entry from a plurality of entries in a cache;
      determine that the first replacement entry in the cache should be protected from replacement;
      identify a second replacement entry from the plurality of entries in the cache;
      determine whether the second replacement entry in the cache should be protected from replacement; and
      replace the second replacement entry in the cache with a new entry in response to determining that the second replacement entry should not be protected from replacement.

11. The computer program product of claim 10, wherein the computer readable program code being configured to determine that the first replacement entry in the cache should be protected from replacement comprises the computer readable program code being configured to:
   determine that contents of the first replacement entry indicate that the first replacement entry should be protected from replacement; and
   determine that a threshold for a number of times the first replacement entry has been protected from replacement has not been met.

12. The computer program product of claim 11, wherein the computer readable program code being configured to determine that the first replacement entry in the cache should be protected from replacement comprises the computer readable program code being further configured to determine that a maximum number of protected entries in the cache has not been met.

13. The computer program product of claim 11, wherein the computer readable program code being configured to determine that the contents of the first replacement entry indicates that the first replacement entry should be protected from replacement comprises the computer readable program code being configured to determine that the contents of the first replacement entry indicate that the first replacement entry corresponds to a page size that is greater than a predefined page size threshold.

14. The computer program product of claim 11, wherein the computer readable program code being configured determine that the contents of the first replacement entry indicates that the first replacement entry should be protected from replacement comprises the computer readable program code being configured to determine that the contents of the first replacement entry indicate that the first replacement entry corresponds to a page size of a predefined large page size.

15. The computer program product of claim 10, wherein the computer readable program code being configured to determine whether the second replacement entry in the cache should be protected from replacement comprises the computer readable program code being configured to determine whether contents of the second replacement entry in the cache indicate that the second replacement entry in the cache corresponds to a page size that is less than a predefined page size threshold, and replace the second replacement entry with a new entry in response to determining that the contents of the second replacement entry indicate that the second replacement entry corresponds to a page size that is less than a predefined page size threshold.

16. An apparatus comprising:
   a processing unit;
   a network interface; and
   a cache entry replacement unit operable to,
      identify, in response to a cache miss, a first replacement entry from a plurality of entries in a cache;
      determine that the first replacement entry in the cache should be protected from replacement;
      identify a second replacement entry from the plurality of entries in the cache;
      determine whether the second replacement entry in the cache should be protected from replacement; and replace the second replacement entry in the cache with a new entry in response to determining that the second replacement entry should not be protected from replacement.

17. The apparatus of claim 16, wherein the cache entry replacement unit being operable to determine whether the second replacement entry in the cache should be protected from replacement comprises the cache entry replacement unit being operable to determine whether contents of the second replacement entry in the cache indicate that the second replacement entry in the cache corresponds to a page size of a predefined small page size, and replacing the second replacement entry with a new entry in response to determining that the contents of the second replacement entry indicate that the second replacement entry corresponds to a page size of a predefined small page size.

18. The apparatus of claim 16, wherein the cache entry replacement unit being operable to determine whether the second replacement entry in the cache should be protected from replacement comprises the cache entry replacement unit being further operable to:
   replace the second replacement entry in the cache with the new entry if the contents indicate that the second replacement entry in the cache corresponds to a small page size; and
   determine whether a third replacement entry is available in the cache for replacement if the second replacement entry in the cache does not correspond to a small page size.

* * * * *